US005787274A

United States Patent [19]
Agrawal et al.

[11] Patent Number: 5,787,274
[45] Date of Patent: Jul. 28, 1998

[54] DATA MINING METHOD AND SYSTEM FOR GENERATING A DECISION TREE CLASSIFIER FOR DATA RECORDS BASED ON A MINIMUM DESCRIPTION LENGTH (MDL) AND PRESORTING OF RECORDS

[75] Inventors: Rakesh Agrawal; Manish Mehta, both of San Jose; Jorma Johannes Rissanen, Los Gatos, all of Calif.

[73] Assignee: International Business Machines Corporation, Armonk, N.Y.

[21] Appl. No.: 564,694

[22] Filed: Nov. 29, 1995

[51] Int. Cl.[6] .................................................... G06F 17/30
[52] U.S. Cl. ........................... 395/613; 395/611; 395/612
[58] Field of Search ................................. 395/613, 611, 395/600, 612

[56] References Cited

U.S. PATENT DOCUMENTS

| | | | |
|---|---|---|---|
| 4,719,571 | 1/1988 | Rissanen et al. | 395/612 |
| 5,490,060 | 2/1996 | Malec et al. | 364/210 |

OTHER PUBLICATIONS

Agrawal et al., "Quest: A project on Database Mining", SIGMOD Conference http://sunsite.ust.hkdblp/db/conf/sigmod/sigmod94–514.html, pp.1–2, 1994.

Shani et al., Fundamentals Of Data Structures, chapter 6 section 6.2, pp. 292–301, 1983.

R. Agrawal et al., An Interval Classifier for Database Mining Applications, Proceedings of the 18th VLDB Conference Vancouver, British Columbia, Aug. 1992.

R. Agrawal et al., Database Mining: A Performance Perspective, IEEE Transactions on Knowledge and Data Engineering, vol. 5, No. 6, pp. 914–925, Special Issue on Learning and Discovery in Knowledge–Based Databases, Dec. 1993.

L. Breiman (Univ. of CA–Berkeley) et al. Classification and Regression Trees (Book) Chapter 2. Introduction to Tree Classification pp. 18–58, Wadsworth International Group, Belmont, CA 1984.

J. Catlett, Megainduction: Machine Learning on Very Large Databases, PhD thesis, Univ. of Syndey, Jun./Dec. 1991.

P. K. Chan et al., Experiments on Multistrategy Learning by Meta–learning. In Proc. Second Intl. Conf. on Info. and Knowledge Mgmt., pp. 314–323, 1993.

S. J. Hong, R–MINI: A heuristic Algorithm for Generating Minimal Rules from Examples. In 3rd Pacific Rim Int'l Conference on Artificial Intelligence, pp. 331–337, Aug. 1994.

U. Fayyad et al., The Attribute, Selection Problem in Decision Tree Generation. In 105h Nat'l Conf. on AI AAAI–92, Learning: Inductive 1992.

M. James, Classification Algorithms (book), Chapters 1–3, QA278.65, J281 Wiley–Interscience Pub., 1985.

M. Mehta et al., Mdl–based Decision Tree Pruning. Int'l Conference on Knowledge Discovery in Databases and Data Mining (KDD–95) Montreal, Canada, pp. 216–221, Aug. 1995.

(List continued on next page.)

Primary Examiner—Thomas G. Black
Assistant Examiner—Greta L. Robinson
Attorney, Agent, or Firm—Khanh Q. Tran

[57] ABSTRACT

A method and apparatus are disclosed for generating a decision tree classifier from a training set of records. The method comprises the steps of: pre-sorting the records based on each numeric record attribute, creating a decision tree breadth-first, and pruning the tree based on the MDL principle. Preferably, the pre-sorting includes generating a class list and attribute lists, and independently sorting the numeric attribute lists. The growing of the tree includes evaluating possible splitting criteria and selecting a splitting test for each leaf node, based on a splitting index, and updating the class list to reflect new leaf nodes. In a preferred embodiment, the splitting index is a gini index. The pruning preferably includes encoding the decision tree and splitting tests in an MDL-based code, and determining whether to convert a node into a leaf node, prune its child nodes, or leave the node intact, based on the code length of the node.

42 Claims, 8 Drawing Sheets

OTHER PUBLICATIONS

J. R. Quinlan et al., Inferring Decision Trees Using Minimum Description Length Principle, Information and Computation 80, pp. 227–248, 1989. (0890–5401/89 Academic Press, Inc.).

Wallace et al., Coding Decision Trees, Machine Learning, 11, pp. 7–22, 1993. (Kluwer Academic Pub., Boston. Mfg. in the Netherlands.).

S. M. Weiss et al., Computer Systems that Learn, Classification and Prediction Methods from Statistics, Neural Nets, Machine Learning, and Expert Systems, pp. 113–143, 1991. Q325.5, W432, C2, Morgan Kaufman Pub. Inc., San Mateo, CA.

S. Murthy et al., Decision Tree Induction: How Effective is the Greed Heuristic? Int'l Conference on Knowledge Discovery in Databases and Data Mining (KDD 95) Montreal, Canada, pp. 222–227.

No. 08/436,794, filed Apr. 14, 1994, for System and Method for Mining Generalized Association Rules in Databases U.S. Pat. No. 5,615,341 (presently unavailable to view).

Training data

| Age | Salary | Class |
|---|---|---|
| 30 | 65 | G |
| 23 | 15 | B |
| 40 | 75 | G |
| 55 | 40 | B |
| 55 | 100 | G |
| 45 | 60 | G |

28

After Initial Read

| Age | Index |
|---|---|
| 30 | 1 |
| 23 | 2 |
| 40 | 3 |
| 55 | 4 |
| 55 | 5 |
| 45 | 6 |

Age List
29

| Salary | Index |
|---|---|
| 65 | 1 |
| 15 | 2 |
| 75 | 3 |
| 40 | 4 |
| 100 | 5 |
| 60 | 6 |

Salary List
30

| | Class | Leaf |
|---|---|---|
| 1 | G | N1 |
| 2 | B | N1 |
| 3 | G | N1 |
| 4 | B | N1 |
| 5 | G | N1 |
| 6 | G | N1 |

Class List
31

FIG. 5

After Global Sorting

| Age | Index |
|---|---|
| 23 | 2 |
| 30 | 1 |
| 40 | 3 |
| 45 | 6 |
| 55 | 5 |
| 55 | 4 |

Age List
29

| Salary | Index |
|---|---|
| 15 | 2 |
| 40 | 4 |
| 60 | 6 |
| 65 | 1 |
| 75 | 3 |
| 100 | 5 |

Salary List
30

| | Class | Leaf |
|---|---|---|
| 1 | G | N1 |
| 2 | B | N1 |
| 3 | G | N1 |
| 4 | B | N1 |
| 5 | G | N1 |
| 6 | G | N1 |

Class List
31

FIG. 6

DATA MINING METHOD AND SYSTEM FOR GENERATING A DECISION TREE CLASSIFIER FOR DATA RECORDS BASED ON A MINIMUM DESCRIPTION LENGTH (MDL) AND PRESORTING OF RECORDS

FIELD OF THE INVENTION

The present invention generally relates to data processing, and more particularly, to the field of computer data mining. In particular, the invention relates to methods and apparatus for generating a decision tree classifier from data records.

BACKGROUND OF THE INVENTION

Data mining involves the development of tools that analyze large databases to extract useful information from them. As an application of data mining, customer purchasing patterns may be derived from a large customer transaction database by analyzing its transaction records. Such purchasing habits can provide invaluable marketing information. For example, retailers can create more effective store displays and more effective control inventory than otherwise would be possible if they know consumer purchase patterns. As a further example, catalog companies can conduct more effective mass mailings if they know that, given that a consumer has purchased a first item, the same consumer can be expected, with some degree of probability, to purchase a particular second item within a defined time period after the first purchase.

Classification of the data records to extract useful information is an essential part of data mining. Of importance to the present invention is the construction of a classifier, from records of known classes, for use in classifying other records whose classes are unknown. As generally known in the prior art, a classifier is generated from input data, also called a training set, which consist of multiple records. Each record is identified with a class label. The input data is analyzed to develop an accurate description, or model, for each class of the records. Based on the class descriptions, the classifier can then classify future records, referred to as test data, for which the class labels are unknown.

As an example, consider the case where a credit card company which has a large database on its card holders and wants to develop a profile for each customer class that will be used for accepting or rejecting future credit applicants. Assuming that the card holders have been divided into two classes, good and bad customers, based on their credit history. The problem can be solved using classification. First, a training set consisting of customer data with the assigned classes are provided to a classifier as input. The output from the classifier is a description of each class, i.e., good and bad, which then can be used to process future credit card applicants. Similar applications of classification are also found in other fields such as target marketing, medical diagnosis, treatment effectiveness, and store location search.

Classification has been studied extensively in the areas of statistics and machine learning. See, for example, "*Computer Systems that Learn: Classification and Prediction Methods from Statistics,*" S. M. Weiss and C. A. Kulikowski, 1991. Popular classification techniques include statistical algorithms, decision trees, rule induction, neural networks, and genetic algorithms. However, existing classification methods lack scalabity and usually break down in cases of large training datasets.

Prior art methods usually have the limitation that the training data should fit in the memory of the computer performing the classification. The restriction is partially due to the fact that there were usually relatively small numbers of training examples available in the applications considered in the prior art. Even in the method described by Agrawal et al. in "*An Interval Classifier For Database Mining Applications*", Proc. of the Very Large Database Conference, August, 1992, the size of the training set was overlooked. Although the classifier described there was constructed with database considerations in mind, the focus instead was on building a classifier that can use database indices to improve retrieval efficiency, and not on training set size.

In data mining applications of classification, very large training sets such as those having several million examples are common. Thus, it is critical in these applications to have a classifier that scales well and can handle training data of this magnitude. As an additional advantage, being able to classify large training data also leads to an improvement in the classification accuracy. Such a result was demonstrated, for example, by J. Catlett in "*Megainduction: Machine Learning on Very Large Databases,*" Ph.D thesis, University of Sidney, 1991 (hereinafter, Catlett).

Another desirable characteristic for a data mining classifier is its short training time, i.e., the ability to construct the class descriptions from the training set quickly. As a result, the methods of the invention are based on a decision-tree classifier. Decision trees are highly developed techniques for partitioning data samples into a set of covering decision rules. They are compact and have the additional advantage that they can be converted into simple classification rules. In addition, they can be easily converted into Structured Query language (SQL) statements used for accessing databases, and achieve comparable or better classification accuracy than other classification methods. Although decision-tree classifiers are known in the art, for example, in Catlett, existing methods suffer one or more drawbacks such as being unable to handle large datasets, slow, and inaccurate in classifying.

The thesis by Catlett describes two methods for improving the learning time of C4.5, which is a decision-tree classifier. The first method is based on the sampling of data at each node of the decision-tree, while the second method discretizes numeric attributes to achieve the improvement. One of the drawbacks of these methods is that they only consider training datasets that could fit in the memory of the computer executing the methods. The largest dataset studied by Catlett has only 32,000 data examples or records. Like other decision tree classifiers in the prior art, the methods studied by Catlett grow the decision trees using a depth-first scheme, i.e., each branch is developed until its leaf nodes are reached before other branches are grown. Such an approach results in the memory constraint problem as well as poor performance.

Other prior art classifiers solve the memory constraint problem and simultaneously improve execution time by partitioning the data into subsets that fit in the memory and developing classifiers for the subsets in parallel. The output of the classifiers are then combined using various algorithms to obtain the final classification. Although this approach reduces running time significantly, studies have shown that the multiple classifiers do not achieve the same level of accuracy of a single classifier that can classify all the data. Still other prior art methods classify data in batches. Such incremental learning methods have the disadvantage that the cumulative cost of classifying data incrementally can sometimes exceed the cost of classifying all of the training set.

Another aspect addressed by the present invention involves the pruning of the originally generated decision tree to obtain a compact and accurate classifier, based on the Minimum Description Length (MDL) principle. Generally, the MDL principle states that the best model for encoding data is the one that minimizes the cost of describing the data in terms of the model and the cost of describing the model. The cost of encoding X, cost(X), is defined as the number of bits required to encode X In the context of decision tree classifiers, the models are the set of trees obtained by pruning the originally obtained tree T, and the data is the training set S. The objective of MDL-based pruning is to find a subtree of T that best describes the training set S. Although MDL-based pruning of decision trees is known in the art, the prior art methods suffer a common disadvantage that they over-prune the trees, causing a decrease in the classification accuracy. See, for example, "*Inferring Decision Trees Using Minimum Description Length Principle*", by J. R. Quinlan and R. L. Rivest, Information and Computation, 1989, and "*Coding Decision Trees*", C. S. Wallace and J. D. Patrick, Machine Learning, Vol. 11, pp. 7–22, 1993.

In the paper "*MDL-based Decision Tree Pruning*", pp. 216–221, Proc. of the International Conference on Knowledge Discovery in Databases and Data Mining, Montreal, Canada, 1995, Mehta et al. presented an alternative application of MDL that yielded small trees without sacrificing accuracy. However, the described algorithm was limited in that it either pruned all or none of the children of a node. As a result, the tree may be over-pruned in certain cases.

Therefore, there remains a need for a method for generating a decision tree classifier which is scalable, compact, and accurate. In addition, it is desirable that the method can generate the classifier efficiently and without the above disadvantages of the prior art.

SUMMARY OF THE INVENTION

It is an object of the present invention to provide a method and system for generating a decision-tree classifier that is scalable on large disk-resident training sets, for classifying data records. Another object of the present invention is to obtain a decision-tree classifier that is compact, accurate, and has short training times. An additional object is to have a classifier that can be easily converted to simple classification rules or to SQL statements for accessing databases. Still another object of the present invention is a method for pruning the original tree without the problem of over-pruning.

The present invention achieves the foregoing and other objects by providing a method for generating a decision tree classifier from a training set of records. Each record is identified with a record class. The method analyzes the training set and develops a description, or model, for each record class. The class descriptions are organized as a decision tree in which each leaf node represents a class. The decision tree classifier then can be used for classifying future records whose classes are unknown.

In accordance with the invention, the method first presorts the records based on the values of their numeric attributes. Next, it creates a decision tree breadth-first, i.e., the branches of the tree are developed in parallel in one pass over the data. A fast subsetting algorithm is also used in the case of categorical attributes for evaluating the splits. Finally, the decision tree is pruned to obtain an optimum classifier using the Minimum Description Length principle, as described in detail below.

Preferably, the pre-sorting of the records includes creating a class list and several attribute lists, each attribute list corresponds to a record attribute. The method next initializes the class list, updating the lists with attribute values for each record, and updating the class labels. The attribute lists are then independently sorted based on the attribute values.

In a preferred embodiment of the invention, the step of creating the decision tree includes evaluating the splitting criteria for each attribute, at each leaf node, and determining a splitting test for the leaf node. The splitting test is the splitting criterion with the highest splitting index. The method next creates child nodes from the leaf node. The child nodes become new leaf nodes, while the previous leaf node becomes an interior node. The records are then partitioned according to the splitting test of the previous leaf node. Finally, the class list is updated to include the newly created leaf nodes.

Preferably, the evaluation of the splitting criteria includes traversing the attribute list for each attribute and identifying a class label corresponding to each value of the attribute. The class histogram for the leaf node referenced by the class label is then updated. The method next computes the splitting index based on that attribute value, if the attribute is numeric. Furthermore, in case the attribute is a categorical attribute, the method determines a subset of the attribute which has the best split at the leaf node, after the entire attribute list has been traversed.

In a preferred embodiment, a fast algorithm is used for determining the subset with the best split for a categorical index. The method evaluates all subsets of a set S of values of the attribute if the cardinality of S, i.e., the number of elements in S, is less than a threshold. Otherwise, the elements of S are added to an initially empty set, one at a time, so that a maximum splitting index for the split is found.

In creating the decision tree, the partitioning of the records preferably includes determining, for each record, a first leaf node to which the record belongs and applying the splitting test for the first leaf node to the record. The step of updating the class list includes identifying the child node of the leaf node to which the record belongs. The method then updates the class histogram for that child node and the class list to reflect the identified child node.

Preferably, the updating step further includes identifying the class label corresponding to each value v of the attribute used in the first leaf node's splitting test and identifying the new class that v belongs to. Next, the class list is updated with the new class label and the node ID of the identified child node.

In another aspect of the invention, a method is disclosed for pruning the originally created decision tree based on the MDL principle to obtain a compact and accurate classifier. In accordance with the invention, the original decision tree and the splitting tests for its leaf nodes are encoded in a MDL-based code. The method next calculates the code length for each node of the tree. Depending on the code lengths resulting from different pruning options at the node, the method determines whether to prune the node, how to prune it, or leave it intact.

In a first preferred embodiment of the pruning stage, each node of the decision tree is encoded using one bit. If the code length for the node in the case it has no child nodes is less than the case where it has both child nodes, both of its child nodes are pruned and the node is converted to a leaf node. Otherwise, the node is left intact. In a second preferred embodiment for pruning, two bits are used to encode each node of the tree. The method evaluates the code lengths for the cases where the node is a leaf node, has a left child, has a right child, and has both child nodes. The method then selects a pruning option that would result in the shortest code length for the node under test.

In a third preferred embodiment of the pruning step, the method uses the first embodiment to obtain a smaller tree from the original decision tree. The smaller tree is further pruned by first examining, for each node, the code lengths in case where the code has only a left child, has only a right child, and has both child nodes. A pruning option is selected so that the shortest code length for the node is obtained.

In still another aspect of the present invention, a computer program product is disclosed for generating a decision tree classifier from a training set of records. The product includes a recording medium, means recorded on the recording medium for instructing the product to perform the described method steps.

In yet another aspect of the present invention, a computer-based system is disclosed for generating a decision tree classifier from training records. The system includes means for pre-sorting the records based on each numeric attribute of the records, means for creating a decision tree from the records, and means for pruning the decision tree based on the MDL principle. Preferably, the pre-sorting means includes means for generating a class list and attribute lists, updating the lists with attribute values, and sorting the numeric attribute lists. The means for creating the decision tree preferably includes means for evaluating the splitting criteria for each attribute, and means for determining a splitting test for each leaf node. In addition, the system included means for creating child nodes from a leaf node, means for partitioning the records based on the splitting test of the leaf node, and means for updating the class list.

In another preferred embodiment, the pruning means includes means for encoding the decision tree and splitting tests in a MDL-based code, means for calculating a code length, and means for determining whether to prune a node based on the code length.

Additional objects and advantages of the present invention will be set forth in the description which follows, and in part will be obvious from the description or may be learned from the practice of this invention. The objects of the invention as described herein may be realized and obtained by means particularly pointed out and distinctly claimed in the appended claims taken in conjunction with the accompanying drawings and detailed specification.

BRIEF DESCRIPTION OF THE DRAWINGS

FIG. 5 illustrates an example of a training set, the class list, and the attribute lists for two numeric attributes before they are sorted.

FIG. 6 illustrates the class list and the attribute lists after the attribute lists are sorted.

DESCRIPTION OF THE PREFERRED EMBODIMENTS

The invention will be primarily described in terms of a method for generating a decision tree classifier. However, persons skilled in the art will recognize that a computing system, which includes suitable programming means for operating in accordance with the method to be disclosed, also falls within the spirit and scope of the invention. In addition, the invention may also be embodied in a computer program product, for instance, a recording medium such as a diskette, for use with a suitable data processing system. Programming means may be provided for directing the data processing system to execute the steps of the method of the invention. Such programming means is typically written on the recording medium in a form read by the data processing system.

Figure 1:
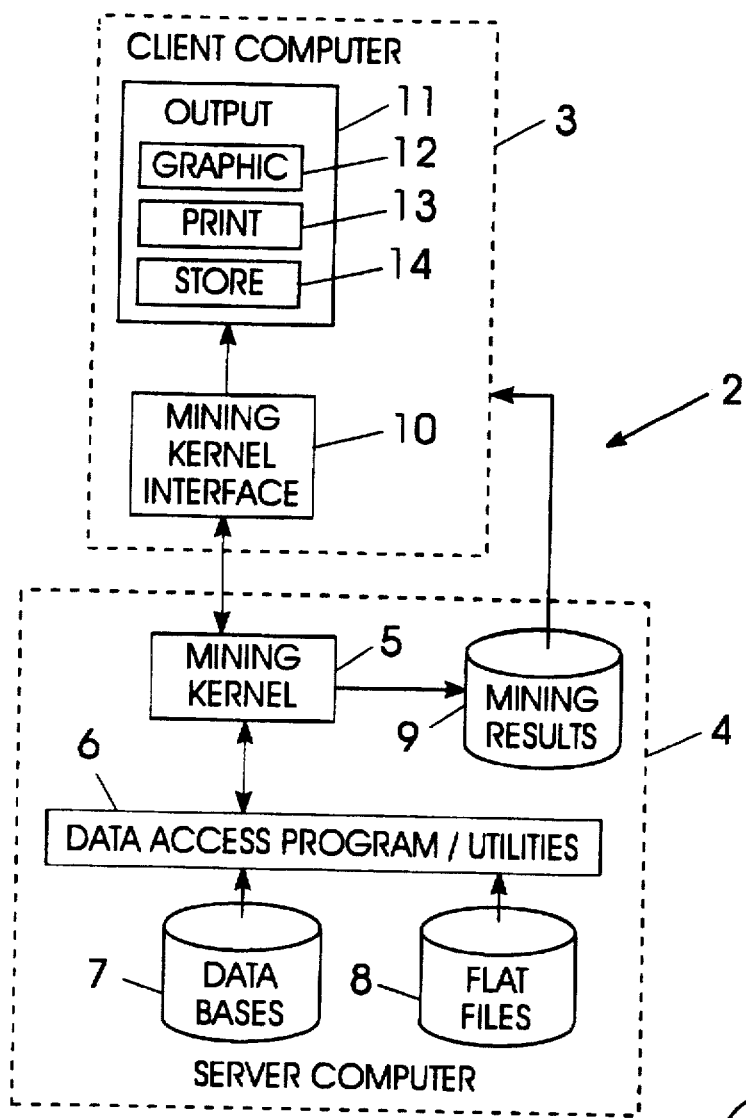
FIG. 1 is a simplified block diagram of a computer system for generating a decision tree classifier of the present invention.

FIG. 1 is a simplified block diagram of a typical computing system 2 with which the method of the invention is to be practiced. In FIG. 1, the system 2 includes one or more data processing apparatus, such as a client computer 3 and a server computer 4. In one intended embodiment, the server computer 4 may be a mainframe computer made by IBM Corp., and use an operating system such as one marketed by IBM Corp. under the name MVS. Alternatively, the server computer 4 may be an IBM RS/6000 workstation running version 3.2.5 of the IBM AIX operating system. The server computer 4 may have a database system such as IBM DB2, or it may have data stored as data files, i.e., flat files, in a data storage medium such as a diskette, disk, or tape. It is to be understood that architectures other than the one shown may be used. For example, the functions of the client computer 3 may be incorporated into the server computer 4, and vice versa.

As shown, the operating system of the server computer 4 includes a mining kernel 5 which may be executed by a processor within the server computer 4 as a series of computer-executable instructions. These instructions may reside, for example, in the RAM of the server computer 4. Alternatively, the instructions may be contained on a data storage device with a computer readable medium, such as a computer diskette, a DASD array, magnetic tape, optical storage device, or other suitable data storage devices. As an illustrative embodiment, the instructions may be implemented using the popular C++ computer programming language.

FIG. 1 shows that, through appropriate data access programs and utilities 6, the mining kernel 5 accesses one or more databases 7 or flat files 8 which contain data transactions. After executing the steps described below, the mining kernel 5 outputs a classifier to a result depository 9, which can be accessed by the client computer 3.

Additionally, FIG. 1 shows that the client computer 3 can include a mining kernel interface 10 which, like the mining kernel 5, may be implemented in suitable computer code. Among other tasks, the interface 10 functions as an input mechanism for establishing certain variables such as the cardinality threshold of an attribute set and the desired number of encoding bits as described below. Further, the client computer 3 preferably includes an output device 11 for outputting or displaying the resulting classifier. As shown, the output device 11 may include a display monitor 12, a printing device 13, or a data storage medium 14.

Figure 2:
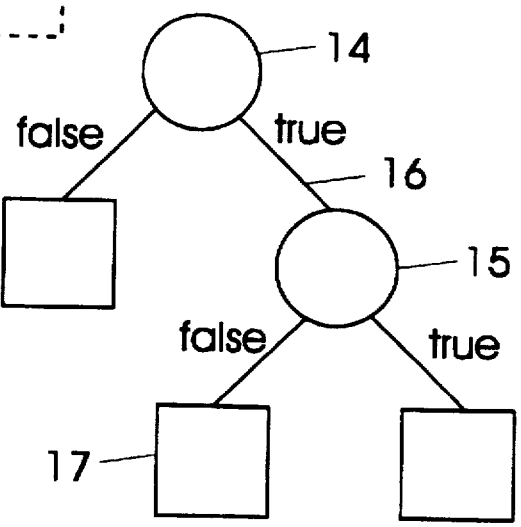
FIG. 2 illustrates an example of a binary decision tree in which each leaf node represents a class of records.

FIG. 2 illustrates an example of a binary decision tree for organizing classes of records, or examples, which is typical of the one used in the invention. The decision tree consists of nodes and branches, such as node 15 and branch 16. Each node represents a single test or decision. In the case of a binary tree, the test is either true or false, corresponding to the two child nodes of the parent node. The starting node 14 is referred to as the root node. Depending on the result of the test, the tree branches left or right. Finally, a leaf or terminal node is reached, such as leaf node 17, which corresponds to a record class assignment. The tree is grown by repeatedly partitioning the records based on the splitting tests so that the records in the same partition belongs to the same class.

Figure 3:
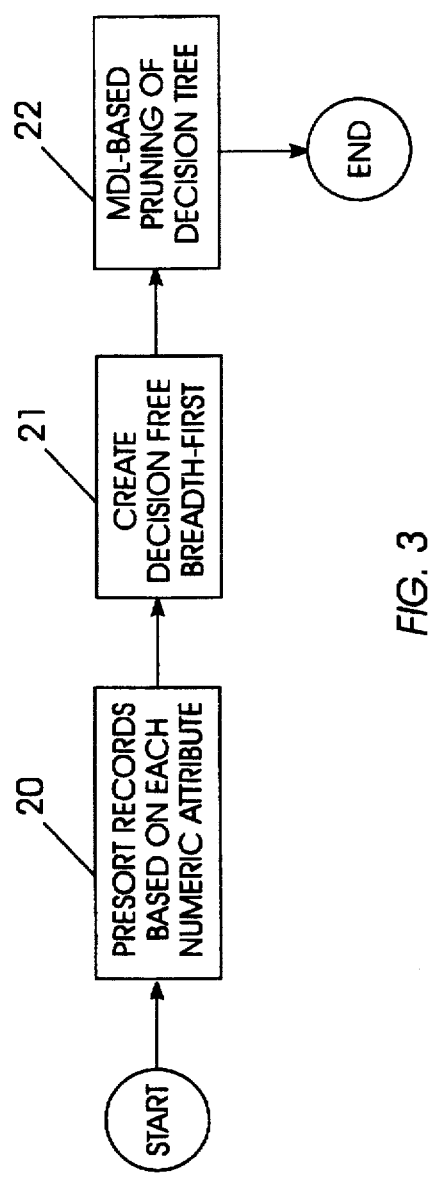
FIG. 3 is a flow chart showing the overall operation of the method of the present invention.

Referring to FIG. 3, the overall operation of the method for generating a decision tree classifier is shown in the form of a flow chart. Beginning with block 20, the method first pre-sorts the records, based on each numeric record attribute. An attribute of the records may be numeric such as employee salary, or categorical, such as job type. Typically, in the growing of a decision tree, the sorting of numeric attribute values dominates the cost of finding the best partitions, or splits, at each tree node. Thus, the pre-sorting of the records significantly reduces the cost of evaluating numeric attributes because it eliminates the need to sort the data at each node of the tree.

At block 21, the decision tree is grown breadth-first, i.e., the nodes at the same depth from the root node are created in parallel on multiple tree branches, instead of developing each branch one at a time until all its leaves are formed. The tree growing stage is further described below in accordance with FIGS. 5 through 9. Finally, at block 22, the decision tree is pruned using an algorithm based on the Minimum Description Length (MDL) principle. The pruning algorithm of the present invention is capable of pruning a subset of the child nodes at each node; thus avoiding the problem of over-pruning. The pruning step is illustrated in more detail in FIGS. 10 through 13.

Figure 4:
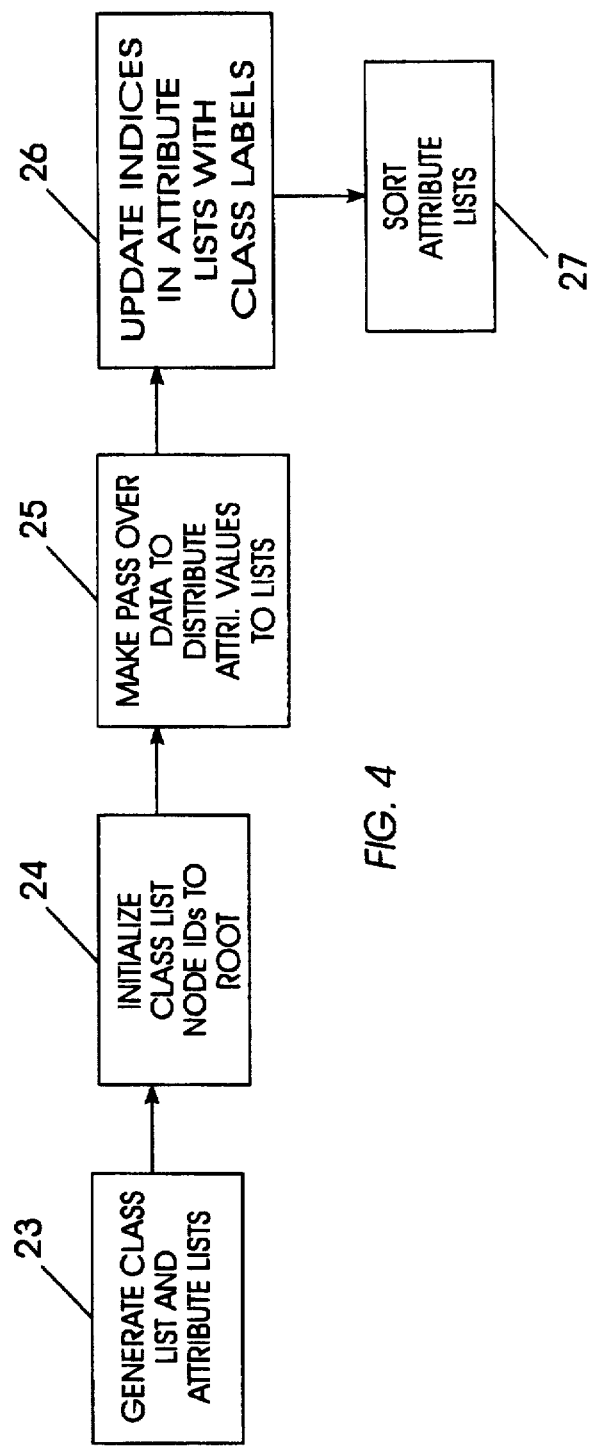
FIG. 4 is a flow chart showing the operation of a preferred embodiment for block 20 of FIG. 3, the pre-sorting of records based on each numeric attribute.

FIG. 4 shows a preferred embodiment for block 20 of FIG. 3, the presorting of records based on each numeric attribute. Beginning at block 23, an attribute list for each attribute and a class list are created. The class list contains all the classes to which the records of the training set belong. Each entry of the class list includes a class label and a node ID, or a reference, pointing to the tree's leaf node for that class. Each entry of an attribute list also includes two fields: a value of the attribute and an index to a class label in the class list. As a result, each node of the decision tree represents a partition of the training set. The partition is defined by the conjunction of the predicates, or splitting criteria, on the path from the root to that node. The class list conveys, at any time, the partition to which a record belongs. Next, at block 24, the node ID fields of all the entries in the class list are initially set to the root node, which is still empty. At block 25, a pass is made over the training set to distribute the values of the attributes for each record across all the lists. In addition, the index associated with each attribute value is updated with the appropriate class label, as shown by block 26. Finally, at block 27, the attribute lists for the numeric attributes are sorted independently. Any common sorting technique known in the art, for example, bubble sort, might be used for this purpose.

FIGS. 5 and 6 illustrate an example the pre-sorting step with respect to a typical training set and its respective lists. In FIG. 5, the training set 28 is shown with two numeric attributes: age and salary. Each record also has a class label. After the initial reading of the records, an age list 29, a salary list 30, and a class list 31 are created. FIG. 6 illustrates the same lists after the attribute lists for age and salary are sorted.

Figure 7:
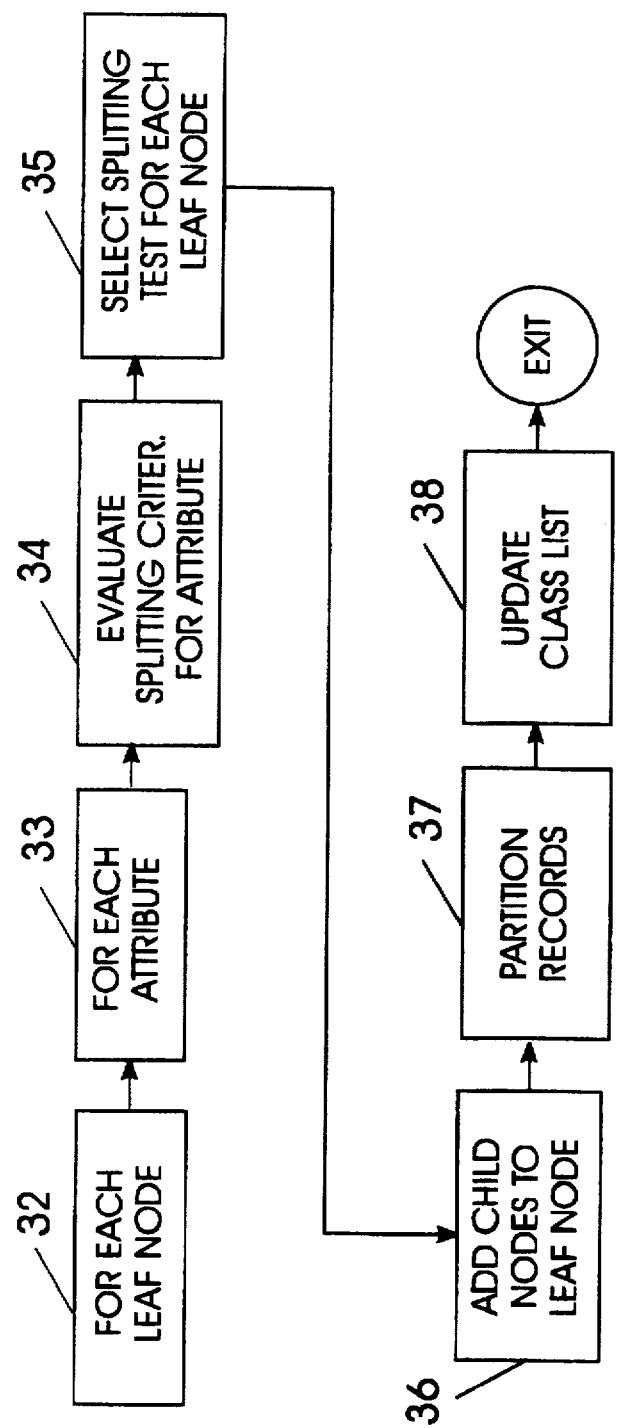
FIG. 7 is a flow chart showing the operation of a preferred embodiment for block 21 of FIG. 3, for creating a decision tree, based on a breadth-first scheme, of the present invention.

Referring to FIG. 7, the flow chart of a preferred embodiment for block 21 of FIG. 3, for creating a decision tree using a breadth-first scheme, is shown. Starting with block 32, at each leaf node and for each record attribute, the method evaluates possible splitting criteria for that attribute in block 34. Since the tree is grown breadth-first, the splits for all the leaf nodes of the current tree are simultaneously evaluated in one pass over the data. The evaluation of the splitting criteria is based on a splitting index which is described below, in accordance with FIGS. 8 and 9.

At block 35, the splitting criterion having the highest splitting index is chosen from the evaluated splitting criteria as the splitting test for the leaf node. Next, at block 36, child nodes are added to the leaf node. The child nodes become new leaf nodes of the tree while the previous leaf node becomes an interior node. Proceeding to block 37, the records are partitioned (or split) according to the splitting test of the previous leaf node. The class list is then updated to reflect the newly created leaf nodes, as shown by block 38.

Figure 8:
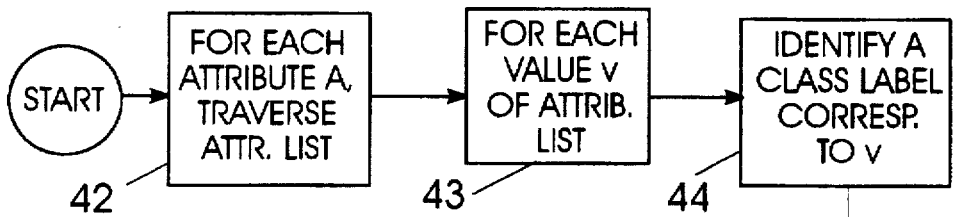
FIG. 8 is a flow chart showing the operation of a preferred embodiment for block 34 of FIG. 7, evaluating possible splitting criteria for each attribute, at each leaf node.
Figure 8:
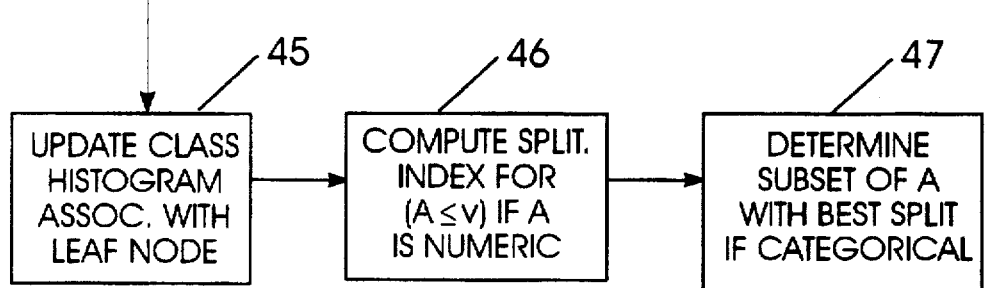

FIG. 8 shows a method for evaluating the splitting criteria for an attribute, corresponding to block 34 of FIG. 7. Starting with block 42, for each attribute A of the records, the respective attribute list is traversed. For each value v of the attribute, the method identifies from the class list a class label corresponding to the value, as shown by blocks 43 and 44. In block 45, the class histogram associated with the leaf node referenced by the identified class label is updated using the class label. Next, at block 46, if the attribute is numeric, as in the case of age and salary attributes, the splitting index for the splitting criterion ($A \leq v$) is computed for the leaf node. The computation of the splitting index is described in more detail below.

The splitting index is accumulated in the class histogram associated with each leaf node. This histogram is discarded after the split for the node has been determined. For a numeric attribute, the histogram is a list of pairs of the form <class, frequency>, where frequency is the frequency distribution of the class in the data partition corresponding to the node. For a categorical attribute, the histogram is a list of triples of the form <attribute value, class, frequency>.

In case where A is a categorical attribute, the method further determines a subset of the attribute A that has the best split, for the leaf node, as shown by block 47. Note that in the case of a categorical attribute, the subset of A is determined only after the attribute list has been completely scanned. Thus, in one traversal of an attribute list, the best split using this attribute is known for all the leaf nodes. Similarly, with one traversal of all the attribute lists, the best overall split for each of the leaf nodes is known. The selected splitting test is saved with the respective leaf node, at block 48.

A splitting index is used to evaluate the goodness of alternative splits for an attribute. In a preferred embodiment of the present invention, the splitting index is based on the gini index, originally proposed by Breiman et al. in "*Classification and Regression Trees,*" Wadsworth, 1984. The attractiveness of this index is that its calculation requires only the distribution of the class values in each of the partitions. If a data set T contains records from n classes, the gini index gini(T) is defined as $$gini(T) = 1 - \Sigma p_j^2$$

where $P_j$ is the relative frequency of class j in data set T. Therefore, if a split divides T into two subsets, $T_1$, and $T_2$, having $n_1$ and $n_2$ records, respectively, the new index of the divided data $gini_{(split)}(T)$ is given by $$gini_{(split)}(T) = \frac{n_1}{n} gini(T_1) + \frac{n_2}{n} gini(T_2)$$

Figure 9:
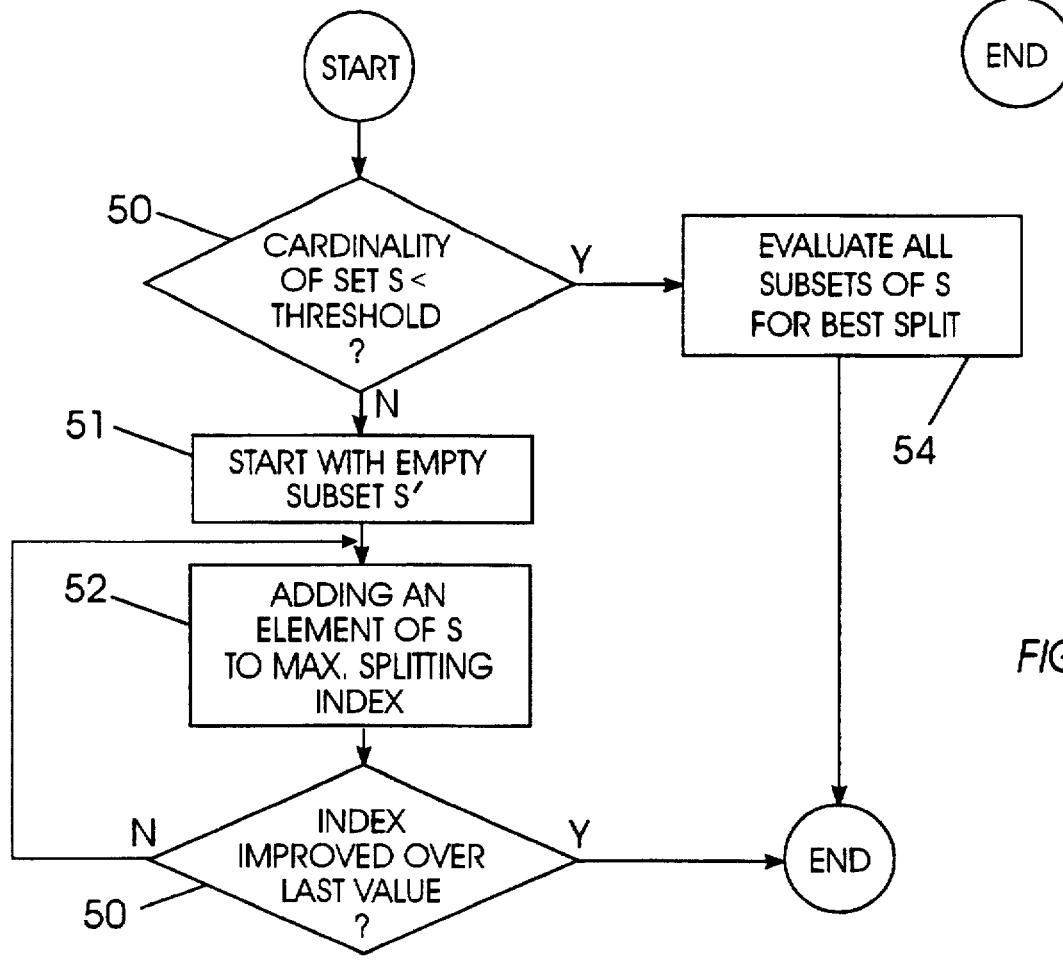
FIG. 9 is a flow chart showing the operation of a preferred embodiment of block 47 of FIG. 8, for determining a subset of a categorical attribute with the best split after its attribute list has been traversed.

FIG. 9 illustrates the flow chart for a preferred embodiment of block 47 of FIG. 8, for determining a subset of an attribute A with the best split. Initially at block 50, the cardinality, or number of elements, of the set S of all values of A is compared to a predetermined threshold. If the cardinality of S is less than the threshold, the method evaluates all the subsets of S to determine one with the best split, based on the splitting index, as shown by block 54. Otherwise, the method starts with an empty subset S' of S and adds one element of S to S' so that the splitting index for the split is maximized, according to blocks 51 and 52. The adding of an element from S is repeated as long as the splitting index for the split continues to improve, as shown by the affirmative branch of block 53. Otherwise, the selection of the subset S' is complete, as shown by the negative branch from block 53.

Figure 10:
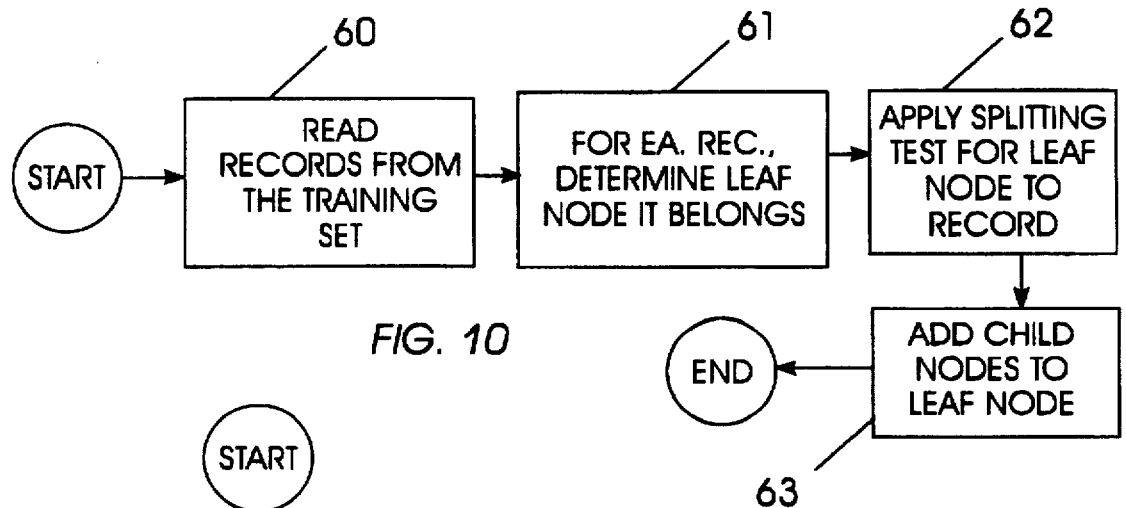
FIG. 10 is a flow chart showing the operation of a preferred embodiment for block 37 of FIG. 7, for partitioning the records according to the splitting test.

Referring now to FIG. 10, the steps for partitioning the records, according to block 37 of FIG. 7, are shown. Beginning at block 60, the records are read from the training set. For each record, the method determines a first leaf node of the decision tree to which it belongs, i.e., the class of the record, as shown by block 61. At block 62, the method applies the splitting test for the first leaf node to the record. Child nodes corresponding to the result of the test are added to the first leaf node as new leaf nodes, at block 63.

Figure 11:
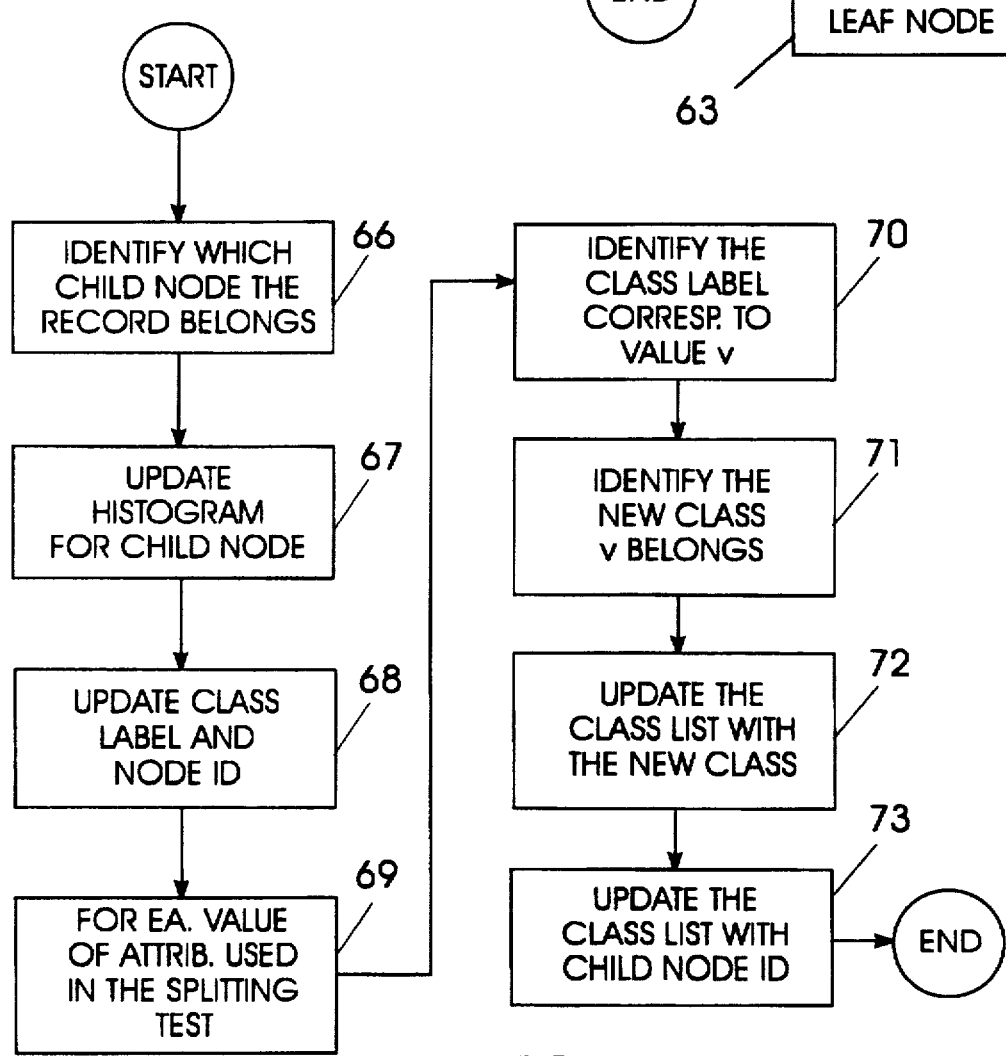
FIG. 11 is a flow chart showing the operation of a preferred embodiment for block 38 of FIG. 7, updating the class list.

FIG. 11 shows the flow chart for a preferred embodiment of step 38 of FIG. 7, for updating the class list. At block 66, the method identifies the child node of the first leaf node to which the record belongs. The class histogram for that child node, which is now a new leaf node, is updated with the class label of the record in block 67. In addition, the class label and node ID field corresponding to the first leaf node are updated to reflect the identified child node, as shown by block 68.

Next, for each value v of the attribute used in the splitting test at the first leaf node, the method identifies the class label in the class list corresponding to that value, as shown by blocks 69 and 70. The method then identifies, at block 71, the class to which v belongs by applying the splitting test at the leaf node referenced by the identified class label. At blocks 72, the class list is updated with the class label of the new class. Also, the node ID referenced by the identified class label is set to the node ID of the child node corresponding to the new class, in block 73.

Figure 12:
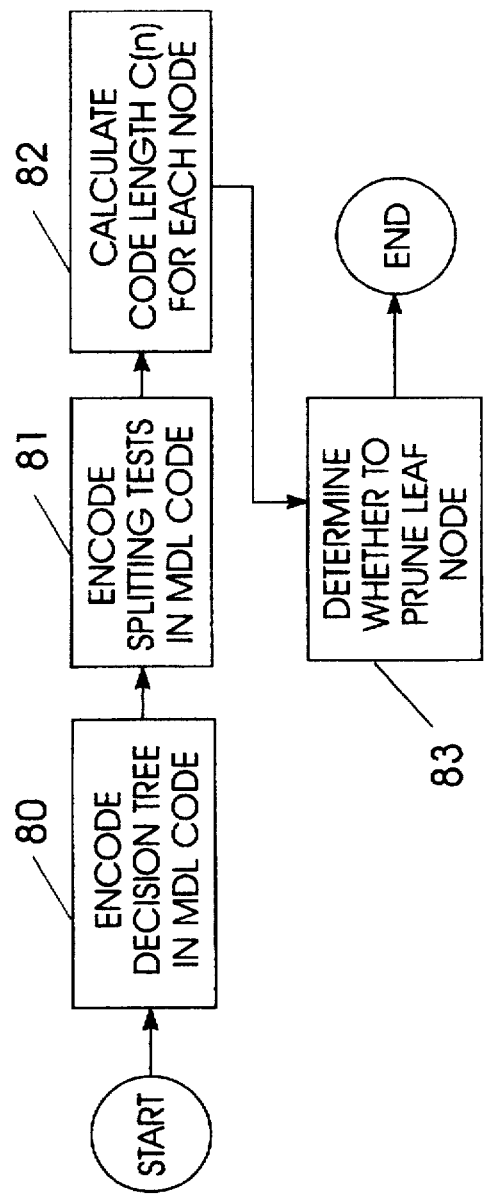
FIG. 12 is a flow chart showing further details of block 22 of FIG. 3 for pruning the decision tree based on the Minimum Description Length principle.

FIG. 12 shows the flow chart for a preferred embodiment of block 22 of FIG. 3, the pruning of the original decision tree based on the MDL principle. The pruning includes two stages: encoding the tree and determining whether to prune the tree and how it is pruned, based on the cost of encoding. First, at block 80, the decision tree is encoded in a MDL-based code. The preferred embodiments for such encoding are described below in accordance with FIGS. 13 and 14. The splitting tests associated with the leaf nodes are also encoded with the MDL-based based code, as shown by block 81. Next, for each node n of the decision tree, the code length for the node is calculated in block 82. At block 83, the method evaluates the code length at each node to determine whether to convert the node into a leaf node, prune the left or the right child node, or leave the node intact.

The code length C(t) for the test options at a node n is calculated as follows:

(i) $C_{leaf}(t) = L(t) + Errors_t$, if t is a leaf node (option 1)

(ii) $C_{both}(t) = L(t) + L_{test} + C(t_1) + C(t_2)$, if t has both child nodes (option 2)

(iii) $C_{left}(t) = L(t) + L_{test} + C(t_1) + C'(t_2)$, if t has only $t_1$ as a child node (option 3); and (iv) $C_{right}(t) = L(t) + L_{test} + C'(t_1) + C(t_2)$, if t has only $t_2$ as a child node (option 4)

where $L_{test}$ is the cost of encoding any test at an internal node, L(t) denotes the cost of encoding the node itself, $Errors_t$ represents the misclassification errors at the node, $C(t_j)$ is the cost of encoding the $I^{th}$ subtree, and $C'(t_j)$ represents the cost of encoding a child node's records using the parent node's statistics.

Figure 13:
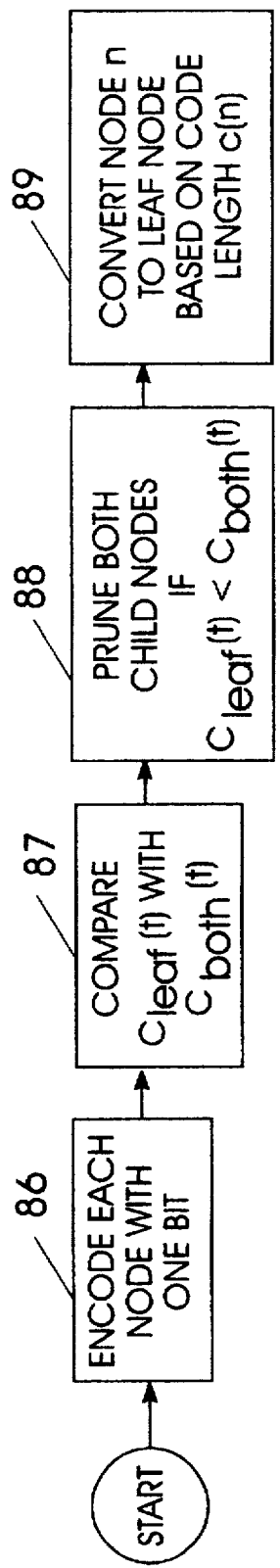
FIG. 13 is a flow chart showing the operation of a preferred embodiment for block 83 of FIG. 12, corresponding to the Full pruning option.
Figure 14:
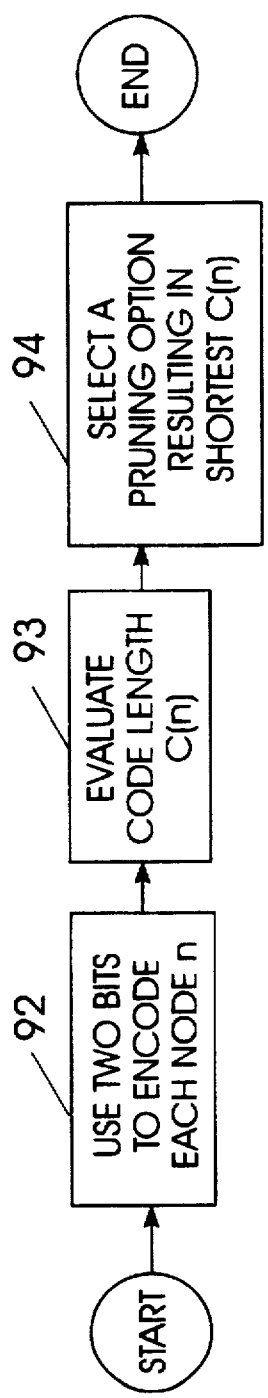
FIG. 14 is a flow chart showing the operation of a preferred embodiment for block 83 of FIG. 12, corresponding to the Partial pruning option.
Figure 15:
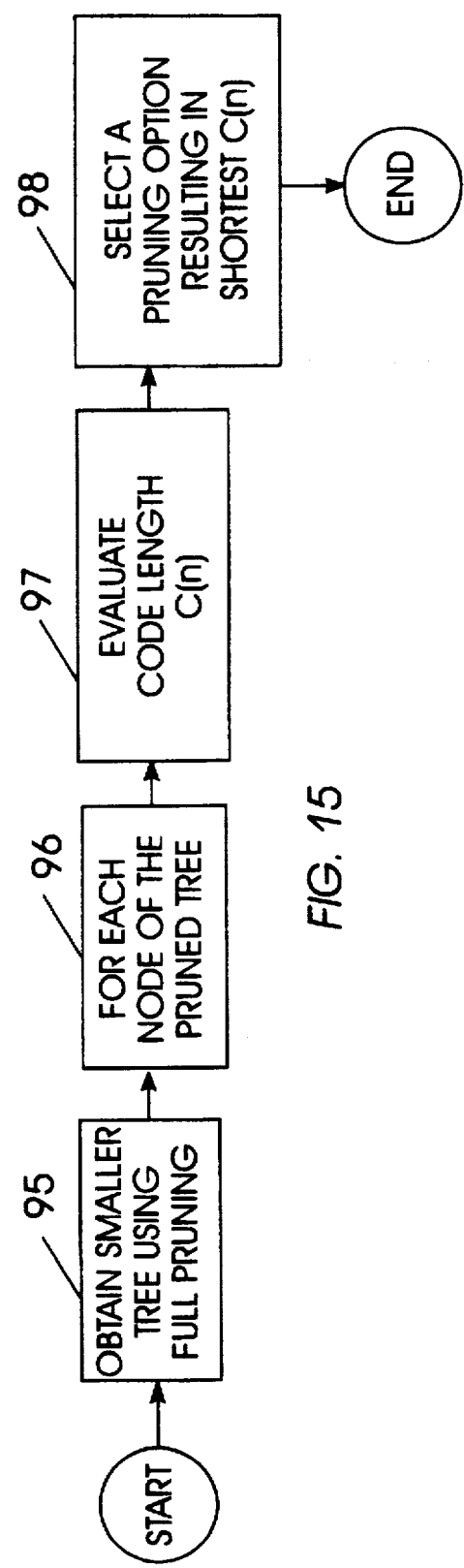
FIG. 15 is a flow chart showing the operation of a preferred embodiment for block 83 of FIG. 12, corresponding to the Hybrid pruning option.

In FIGS. 13 through 15, the flow charts of the preferred embodiments for block 83 of FIG. 12 are shown, for determining whether to prune a tree node and how it is pruned. The embodiment shown in FIG. 13 is referred to as Full pruning and is used in case a node may have either zero or two child nodes, i.e., options 1 and 2. Accordingly, only one bit is needed to encode each node of the decision tree, as shown by block 86. At block 87, the code length in case the node under test has no child nodes, $C_{leaf}(t)$ is compared to the code length in case it has both child nodes, $C_{both}(t)$. If the value of $C_{leaf}(t)$ is smaller than that of $C_{both}(t)$, both child nodes of the test node are pruned and the node is converted into a leaf node, as shown by blocks 88 and 89.

FIG. 14 shows the Partial pruning embodiment of block 83, FIG. 12. The Partial pruning embodiment is desirable in case all four options are applicable to each node of the tree, i.e., the node may be a leaf node, have only a left child node or a right child node, or have both child nodes. At block 92, two bits are used to encode each node n of the decision tree. The Partial pruning strategy evaluates the respective code lengths for the four options, at block 93, and selects the option that results in the shortest code length for node n, at block 94.

Finally, FIG. 15 shows a preferred embodiment for block 83 of FIG. 12, which combines the features of the Full pruning and Partial pruning embodiments. This embodiment is referred to as Hybrid pruning. The Hybrid pruning method prunes the decision tree in two phases. At block 95, it first uses the Full pruning technique to obtain a smaller decision tree from the originally generated tree. The method then considers only options 2, 3, and 4, i.e., the node has a left child node, a right child node, or both, to further prune the smaller tree. Thus, at blocks 96 and 97, for each node of the smaller tree, the method evaluates the code lengths corresponding to the options. It then selects a pruning option that results in the shortest code length for the node, as shown by block 98.

In another aspect of the present invention, a computer program product for use with a computer system is disclosed for generating a decision tree classifier from a training set of records. The computer program product includes a recording medium, means recorded on the recording medium for instructing the product to perform the steps of the methods described above.

In yet another aspect of the present invention, a computer-based system is disclosed for generating a decision tree classifier from a training set of records. The system includes means for pre-sorting the records based each numeric attribute, means for creating a decision tree using a breadth-first scheme, and means for pruning the decision tree based on the MDL principle.

In a preferred embodiment of the invention, the means for pre-sorting includes means for generating an attribute list for each attribute and a class list, means for initializing the lists, and means for sorting each numeric attribute list. In addition, the means for creating the decision tree includes means for evaluating possible splitting criteria for each attribute, at each leaf node, and means for selecting a splitting test for each leaf node. The means for creating also includes means for partitioning the records and updating the class list.

Preferably, the means for evaluating includes means for traversing the attribute list of each attribute, means for identifying a class label corresponding to each value of the attribute, and means for updating the class histogram associated with the referenced leaf node. In addition, means for evaluating includes means for computing a splitting index and means for determining a subset of the attribute with the best split, if the attribute is categorical.

In the preferred embodiments, the system further includes means for repeating the operation of the means for evaluating and means for updating until each leaf node of the decision tree contains only one class of records. In addition, the means for pruning includes means for encoding the decision tree and splitting tests in an MDL-based code, means for calculating a code length for each node, and means for determining whether to prune its child nodes depending on the code length.

In the Full pruning embodiment of the invention, the system includes means for pruning both child nodes of a node and means for converting the node into a leaf node. In the Partial pruning embodiment of the invention, the system includes means for evaluating the code lengths for the cases where the node is a leaf node, has only a left child node, only a right child node, or both child nodes, and means for selecting a pruning option resulting in the shortest code length. In the Hybrid pruning embodiment, the system further includes means for evaluating the code lengths for the cases where the node has only a left child node, a right child node, or both child nodes, and means for selecting a pruning option resulting in the shortest code length for the node.

While several preferred embodiments of the invention have been described, it should be apparent that modifications and adaptations to those embodiments may occur to persons skilled in the art without departing from the cope and the spirit of the present invention as set forth in the following claims.

What is claimed is:

1. A method for generating a decision tree classifier from a training set of records, each record having at least one numeric attribute and a class label of a class to which the record belongs, the method comprising the steps of:

pre-sorting the records based on the numeric attribute;

generating an attribute list for each attribute and a class list, each entry of the class list corresponding to a class label, the attribute list including values of the attribute and indices to the class labels;

creating a decision tree from the pre-sorted records, attribute lists, and class list, using a breadth-first process, the decision tree having a root node, a plurality of interior nodes, and a plurality of leaf nodes, the breadth-first process being such that the nodes of a same depth from the root node are formed in parallel; and pruning the decision tree based on a Minimum Description Length (MDL) scheme to obtain the decision tree classifier, the MDL scheme encoding the decision tree as a model such that an encoding cost for describing the decision tree and the training set is minimized, and the method taking into account the encoding cost in the pruning.

2. The method as recited in claim 1, wherein:

each entry of the class list includes a node ID corresponding to a leaf node; and the step of generating an attribute list includes the steps of:

initializing each node ID to be the root node of the decision tree; and sorting the attribute list for each numeric attribute, based on the attribute values.

3. The method as recited in claim 2, wherein the step of creating includes the steps, executed for each leaf node, of:

evaluating possible splitting criteria for each attribute at the leaf node, each possible splitting criterion having a respective splitting index associated therewith, the step of evaluating being based on the splitting index associated with each splitting criterion;

determining a splitting test for the leaf node from the evaluated splitting criteria, the splitting test being a splitting criterion with a highest splitting index;

creating child nodes for the leaf node, the child nodes becoming new leaf nodes of the decision tree;

partitioning the records according to the splitting test at the leaf node; and updating the class list to reflect the created child nodes.

4. The method as recited in claim 3, wherein:

the attributes further include categorical attributes;

each leaf node has a class histogram associated therewith; and the step of evaluating includes the steps of:
 a) for each attribute A, traversing the attribute list for A;
 b) for each value v in the attribute list for A:
  i) identifying from the class list a class label corresponding to the value v;
  ii) updating the class histogram associated with a leaf node referenced by the identified class label; and
  iii) if the attribute A is numeric, then computing a splitting index for the splitting criterion ($A \leq v$) for the referenced leaf node; and
 c) if A is categorical, then determining a subset of the attribute A with a best split for the referenced leaf node after the attribute list for A has been traversed, the best split being a split with a highest splitting index.

5. The method as recited in claim 4, wherein the splitting index is a gini-index, the gini-index being based on relative frequencies of records from each class contained in the training set.

6. The method as recited in claim 4, wherein:
at least an attribute A of the attributes is categorical;
the step of determining a subset includes evaluating all subsets of a set S of all values of A, if a number of elements in S is less than a threshold; and
the step of determining a subset includes, if the number of elements in S is equal to or more than the threshold, the steps of:
starting with an empty subset S' of the set S, adding an element of S to S' such that the splitting index for the split at the leaf node is maximized; and
repeating the step of adding until there is no improvement in the splitting index.

7. The method as recited in claim 3, wherein:
the step of partitioning includes the steps of:
(i) reading the records from the training set,
(ii) for each record, determining a first leaf node of the decision tree to which the record belongs, and
(iii) applying the splitting test for the first leaf node to the record; and
the step of updating the class list includes the steps of:
(i) identifying the child node of the first leaf node to which the record belongs,
(ii) updating the class histogram associated with the identified child node, and
(iii) updating the class label and node ID corresponding to the first leaf node to reflect the identified child node.

8. The method as recited in claim 7, wherein
the step of updating the class list further includes the steps of, for each value v in the attribute list of the attribute used in the splitting test of the first leaf node:
identifying from the class table a class label corresponding to V;
identifying a new class to which v belongs by applying the splitting test at the leaf node referenced by the identified class label;
updating the identified class label to reflect the new class; and
updating the node ID referenced by the identified class label to be the node ID of the child node corresponding to the new class.

9. The method as recited in claim 3, wherein the steps included in creating the decision tree are repeated until each leaf node of the decision tree contains only one class of records.

10. The method as recited in claim 1, wherein:
the pruning step includes the steps of:
encoding the decision tree in a MDL-based code;
encoding the splitting tests for the leaf nodes in the MDL-based code;
calculating a code length C(n) for each node n of the decision tree; and
determining whether to prune the child nodes of the node n, convert n into a leaf node, or leave n intact, taking into account the encoding cost; and the encoding cost is based on C(n).

11. The method as recited in claim 10, wherein:
the step of encoding the decision tree includes:

(i) encoding each node of the decision tree using one bit, if the possible number of child nodes the node can have is zero and two;
(ii) encoding each node of the decision tree using two bits, if the possible number of child nodes the node can have is zero, one, and two; and
(iii) encoding each node of the decision tree using log(3) bits, if only the internal nodes are examined; and
the encoding cost includes:
(i) a cost for encoding an attribute value v of an attribute A, where the splitting test is of the form $(A \leq v)$ and A is numeric; and
(ii) $\ln n_A$ where $n_A$ is a number of times the splitting test is used in the tree and A is a categorical attribute.

12. The method as recited in claim 10, wherein:
each node n of the decision tree is encoded using one bit; and
the step of determining whether to prune includes the steps of:
pruning both children nodes of the node n; and
converting the node n into a leaf node,
if the code length C(n) when n has both child nodes is more than C(n) when n is a leaf node.

13. The method as recited in claim 10, wherein:
each node n of the decision tree is encoded using two bits; and
the step of determining whether to prune includes the steps of:
evaluating the code length C(n) when n is a leaf node, n has only a left child node, n has only a right child node, and n has both child nodes; and
selecting a pruning option that results in a shortest code length C(n).

14. The method as recited in claim 12 further comprising the steps of:
for each node n of the pruned decision tree, evaluating the code length C(n) when n has only a left child node, n has only a right child node, and n has both child nodes; and
selecting a pruning option that results in a shortest code length C(n).

15. A computer program product for use with a computer system for generating a decision tree classifier from a training set of records, each record having at least one numeric attribute and a class label of a class to which the record belongs, the computer program product comprising:
a recording medium;
means, recorded on the recording medium, for directing the computer system to pre-sort the records based on the numeric attribute;
means, recorded on the recording medium, for directing the computer system to generate an attribute list for each attribute and a class list, each entry of the class list corresponding to a class label, the attribute list including values of the attribute and indices to the class labels:
means, recorded on the recording medium, for directing the computer system to create a decision tree from the pre-sorted records, attribute lists, and class list, using a breadth-first process, the decision tree having a root node, a plurality of interior nodes, and a plurality of leaf nodes, the breadth-first process being such that the nodes of a same depth from the root node are created in parallel; and means, recorded on the recording medium for directing the computer system to prune the decision tree based on a Minimum Description Length (MDL) scheme to obtain the decision tree classifier, the MDL scheme encoding the decision tree as a model such that an encoding cost for describing the decision tree and the training set is minimized, and the method taking into account the encoding cost in the pruning.

16. The computer program product as recited in claim 15, wherein:

each entry of the class list includes a node ID corresponding to a leaf node; and the means for directing to generate an attribute list includes:

means, recorded on the recording medium, for directing the computer system to initialize each node ID to be the root node of the decision tree; and means, recorded on the recording medium, for directing the computer system to sort the attribute list for each numeric attribute, based on the attribute values.

17. The computer program product as recited in claim 16, wherein the means for directing to create includes:

means, recorded on the recording medium for directing the computer system to evaluate possible splitting criteria for each attribute, at each leaf node, each possible splitting criterion having a respective splitting index associated therewith, the evaluation being based on the splitting index associated with each splitting criterion;

means, recorded on the recording medium, for directing the computer system to determine a splitting test for the leaf node from the evaluated splitting criteria, the splitting test being a splitting criterion with a highest splitting index;

means, recorded on the recording medium, for directing the computer system to create child nodes for the leaf node, the child nodes becoming new leaf nodes of the decision tree;

means, recorded on the recording medium, for directing the computer system to partition the records according to the splitting test at the leaf node; and means, recorded on the recording medium, for directing the computer system to update the class list to reflect the created child nodes.

18. The computer program product as recited in claim 17, wherein:

the attributes further include categorical attributes;

each leaf node has a class histogram associated therewith; and the means for directing to evaluate includes:

a) means, recorded on the recording medium, for directing the computer system to traverse the attribute list for each attribute A;

b) for each value v in the attribute list for A:

i) means, recorded on the recording medium, for directing the computer system to identify from the class list a class label corresponding to the value v;

ii) means, recorded on the recording medium, for directing the computer system to update the class histogram associated with a leaf node referenced by the identified class label; and iii) if the attribute A is numeric, then means, recorded on the recording medium, for directing the computer system to compute a splitting index for the splitting criterion (A≤v) for the referenced leaf node; and c) if A is categorical, then means, recorded on the recording medium, for directing the computer system to determine a subset of the attribute A with a best split for the leaf node after the attribute list for A has been traversed, the best split being a split with a highest splitting index.

19. The computer program product as recited in claim 18, wherein the splitting index is a gini-index, the gini-index being based on relative frequencies of records from each class contained in the training set.

20. The computer program product as recited in claim 18, wherein:

at least an attribute A of the attributes is categorical;

the means for directing to determine a subset includes means, recorded on the recording medium, for directing the computer system to evaluate all subsets of a set S of all values of A, if a number of elements in S is less than a threshold; and if a number of elements in S is equal to or more than a threshold, then the means for directing to determine a subset includes:

means, recorded on the recording medium, for directing the computer system to add, starting with an empty subset S' of the set S, an element of S to S' such that the splitting index for the split at the leaf node is maximized; and means, recorded on the recording medium, for directing the computer system to repeat the adding until there is no improvement in the splitting index.

21. The computer program product as recited in claim 17, wherein:

the means for directing to partition includes means, recorded on the recording medium, for directing the computer system to:

(i) read the records from the training set, (ii) for each record, determine a first leaf node of the decision tree to which the record belongs, and (iii) apply the splitting test for the first leaf node to the record; and the means for directing to update the class list includes means, recorded on the recording medium, for directing the computer system to:

(i) identify the child node of the first leaf node to which the record belongs, (ii) update the histogram associated with the identified child node, and (iii) update the class label and node ID corresponding to the first leaf node to reflect the identified child node.

22. The computer program product as recited in claim 21, wherein the means for directing to update the class list further includes, for each value v in the attribute list of the attribute used in the splitting test of the first leaf node:

means, recorded on the recording medium, for directing the computer system to identify from the class table a class label corresponding to V;

means, recorded on the recording medium, for directing the computer system to identify a new class to which v belongs by applying the splitting test at the leaf node referenced by the identified class label;

means, recorded on the recording medium, for directing the computer system to update the identified class label to reflect the new class; and means, recorded on the recording medium, for directing the computer system to update the node ID referenced by the identified class label to be the node ID of the child node corresponding to the new class.

23. The computer program product as recited in claim 17, wherein the operation of the means for directing to create the decision tree is repeated until each leaf node of the decision tree contains only one class of records.

24. The computer program product as recited in claim 15, wherein the means for directing the system to prune includes:

means, recorded on the recording medium, for directing the computer system to encode the decision tree in a MDL-based code;

means, recorded on the recording medium, for directing the computer system to encode the splitting tests for the leaf nodes in the MDL-based code;

means, recorded on the recording medium, for directing the computer system to calculate a code length C(n) for each node n of the decision tree; and means, recorded on the recording medium, for directing the computer system to determine whether to prune the child nodes of the node n, convert n into a leaf node, or leave n intact, taking into account the encoding cost; and wherein the encoding cost is based on C(n).

25. The computer program product as recited in claim 24, wherein:

the means for directing the system to encode the decision tree includes:
(i) means, recorded on the recording medium, for directing the computer system to encode each node of the decision tree using one bit, if the possible number of child nodes for the node is zero and two;
(ii) means, recorded on the recording medium, for directing the computer system to encode each node of the decision tree using two bits, if the possible number of child nodes for the node is zero, one, and two; and
(iii) means, recorded on the recording medium, for directing the computer system to encode each node of the decision tree using log(3) bits, if only the internal nodes are examined; and the encoding cost includes:
(i) a cost for encoding an attribute value v of an attribute A, where the splitting test is of the form (A≦v) and A is numeric; and
(ii) ln $n_A$ where $n_A$ is a number of times the splitting test is used in the tree and A is a categorical attribute.

26. The computer program product as recited in claim 24, wherein:

each node of the decision tree is encoded using one bit; and the means for directing the system to determine whether to prune includes:

means, recorded on the recording medium, for directing the computer system to prune both child nodes of the node n; and means, recorded on the recording medium, for directing the computer system to convert the node n into a leaf node, if the code length C(n) when n has both child nodes is more than C(n) when n is a leaf node.

27. The computer program product as recited in claim 24, wherein:

each node of the decision tree is encoded using two bits; and the means for directing the system to determine whether to prune includes:

means, recorded on the recording medium, for directing the computer system to evaluate the code length C(n) when n is a leaf node, n has only a left child node, n has only a right child node, and n has both child nodes; and means, recorded on the recording medium, for directing the computer system to select a pruning option that results in a shortest code length C(n).

28. The computer program product as recited in claim 26 further comprising:

means, recorded on the recording medium, for directing the computer system to evaluate, for each node n of the pruned decision tree, the code length C(n) when n has only a left child node, n has only a right child node, and n has both child nodes; and means, recorded on the recording medium, for directing the computer system to select a pruning option that results in a shortest code length C(n).

29. A computer-based system for generating a decision tree classifier from a training set of records, each record having at least one numeric attribute and a class label of a class to which the record belongs, the system comprising:

means for pre-sorting the records based on the values of the numeric attribute;

means for generating an attribute list for each attribute and a class list, each entry of the class list corresponding to a class label, the attribute list including values of the attribute and indices to the class labels;

means for creating a decision tree from the pre-sorted records, attribute lists, and class list, using a breadth-first process, the decision tree having a root node, a plurality of interior nodes, and a plurality of leaf nodes, the breadth-first process being such that the nodes of a same depth from the root node are formed in parallel; and means for pruning the decision tree based on a Minimum Description Length (MDL) scheme to obtain the decision tree classifier, the MDL scheme encoding the decision tree as a model such that an encoding cost for describing the decision tree and the training set is minimized, and the method taking into account the encoding cost in the pruning.

30. The system as recited in claim 29, wherein:

each entry of the class list includes a node ID corresponding to a leaf node; and the means for generating an attribute list includes:

means for initializing each node ID to be the root node of the decision tree; and means for sorting the attribute list for each numeric attribute, based on the attribute values.

31. The system as recited in claim 30, wherein the means for creating includes:

means for evaluating possible splitting criteria for each attribute, at each leaf node, each possible splitting criterion having a respective splitting index associated therewith, the evaluation being based on the splitting index associated with each splitting criterion;

means for determining a splitting test for each leaf node from the evaluated splitting criteria, the splitting test being a splitting criterion with a highest splitting index;

means for creating child nodes for each leaf node, the child nodes becoming new leaf nodes of the decision tree;

means for partitioning the records according to the splitting test at each leaf node; and means for updating the class list to reflect the created child nodes.

32. The system as recited in claim 31, wherein:

the attributes further include categorical attributes;

each leaf node has a class histogram associated therewith; and the means for evaluating includes:
 a) means for traversing, for each attribute A, the attribute list for A;
 b) for each value v in the attribute list for A:
  i) means for identifying from the class list a class label corresponding to the value v;
  ii) means for updating the class histogram associated with a leaf node referenced by the identified class label; and
  iii) if the attribute A is numeric, then means for computing a splitting index for the splitting criterion ($A \leq v$) for the referenced leaf node; and
 c) if A is categorical, then means for determining a subset of the attribute A with a best split for the referenced leaf node after the attribute list for A has been traversed, the best split being a split with a highest splitting index.

33. The system as recited in claim 32, wherein the splitting index is a gini-index, the gini-index being based on relative frequencies of records from each class contained in the training set.

34. The system as recited in claim 32, wherein:

at least one attribute A of the attributes is categorical;

the means for determining a subset includes means for evaluating all subsets of a set S of all values of A, if a number of elements in S is less than a threshold; and if the number of elements in S is equal to or more than the threshold, the means for determining a subset includes:
 means for adding, starting with an empty subset S' of the set S, an element of S to S' such that the splitting index for the split at the leaf node is maximized; and
 means for repeating the adding until there is no improvement in the splitting index.

35. The system as recited in claim 31, wherein:

the means for partitioning includes:
 (i) means for reading the records from the training set,
 (ii) means for determining, for each record, a first leaf node of the decision tree to which the record belongs, and
 (iii) means for applying the splitting test for the first leaf node to the record; and the means for updating the class list includes:
 (i) means for identifying the child node of the first leaf node to which the record belongs,
 (ii) means for updating the class histogram associated with the identified child node, and
 (iii) means for updating the class label and node ID corresponding to the first leaf node to reflect the identified child node.

36. The system as recited in claim 35, wherein the means for updating the class list further includes:

for each value v in the attribute list of the attribute used in the splitting test, of the first leaf node:
 means for identifying from the class table a class label corresponding to a value v;
 means for identifying a new class to which v belongs by applying the splitting test at the leaf node referenced by the identified class label;
 means for updating the identified class label to reflect the new class; and
 means for updating the node ID referenced by the identified class label to be the node ID of the child node corresponding to the new class.

37. The system as recited in claim 31, wherein the operation of the means for creating the decision tree is repeated until each leaf node of the decision tree contains only one class of records.

38. The system as recited in claim 29, wherein:

the means for pruning includes:
 means for encoding the decision tree in a MDL-based code;
 means for encoding the splitting tests for the leaf nodes in the MDL-based code;
 means for encoding a code length C(n) for each node n of the decision tree; and
 means for determining whether to prune the child nodes of the node n, convert n into a leaf node, or leave n intact, taking into account the encoding cost; and the encoding cost is based on C(n).

39. The system as recited in claim 38, wherein:

the means for encoding the decision tree includes:
 (i) means for encoding each node of the decision tree using one bit, if the possible number of child nodes for the node is zero and two;
 (ii) means for encoding each node of the decision tree using two bits, if the possible number of child nodes for the node is zero, one, and two; and
 (iii) means for encoding each node of the decision tree using log(3) bits, if only the internal nodes are examined; and the encoding cost includes:
 (i) a cost for encoding an attribute value v of an attribute A, where the splitting test is of the form ($A \leq v$) and A is numeric; and
 (ii) $\ln_A$ where $n_A$ is a number of times the splitting test is used in the tree and A is a categorical attribute.

40. The system as recited in claim 38, wherein:

each node of the decision tree is encoded using one bit; and the means for determining whether to prune includes:
 means for pruning both child nodes of the node n; and
 means for converting n into a leaf node, if the code length C(n) when n has both child nodes is more than C(n) when n is a leaf node.

41. The system as recited in claim 38, wherein:

each node of the decision tree is encoded using two bits; and the means for determining whether to prune includes:
 means for evaluating the code length C(n) when n is a leaf node, n has only a left child node, n has only a right child node, and n has both child nodes; and
 means for selecting a pruning option that results in a shortest code length C(n).

42. The system as recited in claim 40 further comprising:

means for evaluating, for each node n of the pruned decision tree, the code length C(n) when n has only a left child node, n has only a right child node, and n has both child nodes; and means for selecting a pruning option that results in a shortest code length C(n).

* * * * *